UNITED STATES PATENT OFFICE.

HANS M. OLSON, OF LOS ANGELES, CALIFORNIA.

PROCESS FOR MAKING WATERPROOF CEMENT AND PRODUCT.

1,283,546.  Specification of Letters Patent.  Patented Nov. 5, 1918.

No Drawing.  Application filed January 19, 1917.  Serial No. 143,246.

*To all whom it may concern:*

Be it known that I, HANS M. OLSON, a citizen of the United States, residing at Los Angeles, in the county of Los Angeles and State of California, have invented a new and useful Process for Making Waterproof Cement and Product, of which the following is a specification.

This invention relates to cements and plasters, and more particularly it concerns certain improved methods for imparting superior water proofing qualities, toughness, and plasticity to ordinary hydraulic cement, such as Portland cement, lime, gypsum, hydraulic lime, natural cement, oxychlorid of magnesium, alkali metal silicate, or any cementitious material having hydraulic qualities and which give an alkaline reaction.

One object of this invention is to formulate a process whereby a non-volatile oil, oil residuum or other oleaginous substance may be mixed or mingled with a cement or cementitious product during the course of its manufacture while the cement is in a dry state, and without the use of any drying agent or other ingredient to accomplish the same, and in which the use of reactive agents, other than that naturally contained in the cementitious material, is dispensed with.

A further object of this invention is to formulate a process whereby a waterproof cement or plaster may be produced at small cost.

Another object is to produce a waterproof cement or plaster which will permanently retain its original desirable properties.

Heretofore cement and plaster have been waterproofed by the addition of a waterproofing compound consisting usually of an oleaginous substance which has been emulsified by boiling in an alkaline solution of water and lime. This emulsion must then be mixed or interground with the cement to be waterproofed. This entails a great amount of expense, and does not result in a satisfactory waterproof cement, as during the boiling and mixing process an insoluble calcium soap is usually formed except where mineral oil or petroleum is employed, which while it may be waterproof in itself, cannot waterproof a cement structure unless so much is used as to render its cost prohibitive and also to weaken the product.

Another method of waterproofing cement products consists in mixing a mineral oil with the mortar after the cement and aggregate have been mixed with water and before the same has set. This results in a partial emulsification of the oil. The oil being suspended in coarse drops in the mixture weakens those spots to a great extent. Owing to the fact that a close, intimate mixture cannot be obtained it is impossible to produce a waterproof concrete by this method.

My present invention primarily resides in mixing a small amount of oil or oleaginous substance with a cement or cementitious material during its process of manufacture, and without the use of an intermediate agent.

In carrying out my process I prefer to bring about the desired result by mixing an oil or oleaginous substance with the cement or plaster during or before the last grinding, to which it is subjected in the process of manufacture. I prefer to add the oil to the cement or cementitious material in a fine spray or stream as it enters the tube mill in the final grinding operation. I may, however, add the oil at any suitable time during the process of manufacturing the cement or plaster.

I may also add the oil or oleaginous substance at other times, as for instance if it is desired to treat a cement or plaster after the manufacturing operations are complete, I bring this about by subjecting the material to another grinding in a tube mill or other suitable mixing device, adding the oil as stated above.

I prefer to use a liquid oil or oleaginous substance, but I may use an oleaginous substance which is normally a solid or semi-solid. In this case I may liquefy the same with heat or by using a suitable solvent, or I may add it in its normal state to the cement or plaster in such quantities that the right proportion may be interground or mixed with the cementitious material being manufactured.

I prefer to use a quantity of oil or oleaginous matter equal to from one tenth of one per cent. to ten per cent. of the weight of the cementitious material, but I do not limit myself to these proportions, as in some cases it may be desirable to vary the proportions.

I may use an oil of either mineral, vegetable, or animal origin, or I may use a combination of any of these oils, and while I prefer to use an oil which is normally a liquid, I may use an oleaginous substance which is normally a solid, or semi-solid, such as wax, tallow, paraffin, bitumen, or any of the fatty acids.

While I get equally good results by using any nonvolatile oleaginous substance as stated above, in practice I prefer to use a composition consisting of approximately seventy-five parts of a residue mineral oil and twenty-five parts beef fat or stearin, as it has been found by experiments that this combination of oleaginous substances gave good results at a low cost. It has been shown by experiment that one per cent. of this oleaginous mixture by weight added to ninety-nine per cent. of dry cementitious material by the process herein described, will produce a cement having great plasticity and high waterproofing qualities. It has also been found that cement so treated is more resilient and tougher than cements as now prepared, and will finish smoother than cements not so treated and with a tougher wearing surface.

By directly adding the oleaginous matter to the cementitious material during the grinding of the latter both become thoroughly commingled and comminuted and a uniform product may be obtained. The cement or oleaginous matter may be heated to facilitate intermixture thereof.

Portland cement prepared by this process, and with the ingredients herein described, attains great plasticity when used in a mortar, and is better adapted than ordinary cement for many of the common uses to which such material has been put.

Cement thus prepared is quite moisture-resistant while in a dry state, and although it will mix readily with water in forming a mortar, yet it has lost a great deal of its power to absorb moisture from the atmosphere, and cement so prepared will not set or cake in the bags, even though exposed to intimate contact with moisture for some time.

It has been found that lime, gypsum, and other plasters which deteriorate rapidly when exposed to moisture become almost as weather resistant as Portland cement when prepared according to the herein described process.

In carrying out the process I employ the oleaginous matter in such small quantity in proportion to the volume of the cementitious material as not to destroy the alkaline reaction properties of the latter.

The dry cement formed by this process when moistened and set, forms a relatively waterproof body, having the desirable qualities attributed to so called water proof cements obtained by mixing compounds with the cement before or after its finished grinding, without the disadvantages of requiring separate processes of forming the compounds. The low cost of oleaginous materials suitable for this process and the simple means of incorporating same in the cement renders this a process by which a waterproof cement may be obtained at a cost slightly above the cost of the production of the ordinary cement.

I claim:

1. The process of preparing water proof cement consisting in adding a substance consisting solely of oleaginous material to a dry cementitious material while grinding the latter.

2. The process of preparing water proof cement consisting in grinding a mixture of a dry cementitious material and a substance consisting solely of oleaginous material.

3. The process of preparing water proof cement consisting in thoroughly commingling a substance consisting solely of oleaginous material with dry pulverulent cementitious material capable of an alkaline reaction.

4. The process of preparing water proof cement consisting in directly admixing 99 parts of dry cementitious material with one part of a substance consisting solely of oleaginous material.

5. The process of preparing water proof cement consisting in finely comminuting dry cementitious material having alkaline reaction properties, and simultaneously adding and intermixing approximately one per cent. of a substance consisting solely of oleaginous material.

6. The process of preparing water proof cement consisting in finely comminuting dry cementitious material having alkaline reactive properties, and simultaneously adding and intermixing therewith a relatively small per cent. of a substance consisting solely of oleaginous material.

7. The process of preparing cement consisting in incorporating with dry cementitious material an ingredient consisting solely of oleaginous material.

8. The process of preparing cement consisting in incorporating with dry cementitious material an ingredient consisting solely of oleaginous material in such small quantity in proportion to the volume of the cementitious material as not to destroy the alkaline reactive properties of the latter.

9. A water proof cement comprising a dry pulverulent cementitious material intermixed with a small per cent. of a substance consisting solely of oleaginous material.

10. A water proof cement comprising approximately 99 parts of pulverulent material and about one part of a substance consisting solely of oleaginous material.

11. The process of preparing waterproof cement consisting in adding mineral oil to dry cement while grinding the latter.

12. The process of preparing waterproof cement consisting in incorporating with dry cementitious material an ingredient consisting solely of mineral oil in such small quantity in proportion to the volume of the cementitious material as not to destroy the alkaline reaction properties of the latter.

13. The process of preparing a waterproof cement consisting in directly admixing 99 parts of dry cementitious material with one part of mineral oil.

14. A waterproof cement comprising approximately 99 parts of dry pulverulent cementitious material and about one part of mineral oil.

15. The process of preparing waterproof cement consisting in incorporating with a dry cementitious material while grinding, an ingredient consisting of an anhydrous oleaginous matter free from driers and alkaline substances in such small quantity in proportion to the volume of the cementitious material as not to destroy the alkaline reaction properties of the latter.

16. The process of preparing waterproof cement consisting in incorporating with a dry cementitious material while grinding, an ingredient consisting of an anhydrous oleaginous matter, free from driers and alkaline substances, in the proportions of 99 parts of the cementitious material and one part oleaginous matter.

HANS M. OLSON.